(12) United States Patent
Chapman et al.

(10) Patent No.: US 6,304,552 B1
(45) Date of Patent: Oct. 16, 2001

(54) MEMORY AND APPARATUS FOR INPUT BASED CONTROL OF DISCARDS IN A LOSSY PACKET NETWORK

(75) Inventors: Alan Stanley John Chapman, Kanata (CA); Hsiang T. Kung, Lexington, MA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/151,709

(22) Filed: Sep. 11, 1998

(51) Int. Cl.[7] .................................................. H04L 12/26
(52) U.S. Cl. ............................................ 370/232; 370/235
(58) Field of Search .................................... 370/232, 238, 370/235; 455/303

(56) References Cited

U.S. PATENT DOCUMENTS

| | | | |
|---|---|---|---|
| 4,959,873 | * 9/1990 | Flynn et al. | 455/303 |
| 5,233,604 | * 8/1993 | Ahmudi et al. | 370/238 |
| 5,245,607 | * 9/1993 | Caram | 370/238 |
| 6,049,527 | * 4/2000 | Isoyama et al. | 370/235 |

OTHER PUBLICATIONS

Sally Floyd and Van Jacobson, "Link–sharing and Resource Management Models for Packet Networks", To appear in IEEE/ACM Transactions on Networking, vol. 3 No. 4, Aug. 1995.
"A Two–bit Differentiated Services Architecture for the Internet", published on the Internet in Nov. 1997.

* cited by examiner

Primary Examiner—Salvatore Cangialosi
(74) Attorney, Agent, or Firm—Allan P. Millard

(57) ABSTRACT

The present invention relates to a lossy switch for processing data units, for example IP data packets. The switch can be implemented as a contained network that includes a plurality of input ports, a plurality of output ports and a lossy switch fabric capable of establishing logical pathways to interconnect a certain input port with a certain output port. A characterizing element of the switch is its ability to control the discard of data packets at a transport point within the switch. This control mechanism prevents and reduces congestion which may occur within the switch fabric and at the level of the input and output ports. The system also supports priorities, routing HI priority request data packets over the switch fabric before LO priority request data packets, and discarding LO priority data packets first when controlling congestion.

35 Claims, 10 Drawing Sheets

Access Point Router

Transport Node

Transport Fabric

| Port | Minimum Bandwidth | Maximum Bandwidth |
|---|---|---|
| A | 3 Mb/s | 3 Mb/s |
| E | 5 Mb/s | 10 Mb/s |

Figure 4

Bandwidth Control Mechanism for a Logical Pathway

MEMORY AND APPARATUS FOR INPUT BASED CONTROL OF DISCARDS IN A LOSSY PACKET NETWORK

FIELD OF THE INVENTION

The present invention relates to the field of data communication networks. More specifically, it pertains to a device and method for ingress control of output bandwidth allocation and packet loss at routing nodes connected by lossy network arrangements.

BACKGROUND OF THE INVENTION

The following paragraphs give definitions of terms relevant to this document:

Physical Link: A single point-to-point serial transmission link between two nodes in a network (such as between two routers or between a router and a host machine).

Physical Output Port: The output port of the router that supports one physical link.

Logical Link: A point-to-point traffic path between two routers that is composed of multiple parallel physical links and appears from a routing point of view to be one link.

Logical Output Port: The collection of physical output ports that support the physical links of a logical link.

Internet Protocol (IP): A library of routines called on by various network communications applications. IP is responsible for transporting packets of data from node to node. It forwards each packet based on a four-byte destination address (IP number).

Switch: The term switch refers to a single router or packet switch within a communications network. Alternatively, it can refer to a contained network with a fixed population of inputs and outputs.

A typical data communication network operates in a connectionless mode whereby there is no negotiation between the transmitter, receiver and the network with regard to the type or quantity of traffic that is to be sent. The transmitter simply sends the traffic on the network, and relies on the network components to deliver that traffic to the receiver accurately. These network components consist typically of routing nodes (also known as routers or switches) joined by physical links. The main function of the routing nodes is to direct incoming packets to the appropriate outgoing links. In the event of too much traffic arriving for an outgoing link, the router applies specific policies to decide which traffic is forwarded and which is discarded. It is important that these policies are not subverted by having arbitrary loss of the forwarded traffic as it moves to the next point that implements the management policies. The term lossy, as applied to a router or a switch, implies that there may be loss of traffic between an input port and an output port. As applied to a network, the term lossy implies that traffic may be lost between one routing node and the next routing node on the particular traffic path. Consequently, in order to achieve good performance and resource sharing within a lossy network arrangement, there must be efficient implementation of packet loss and bandwidth allocation policies at all transport nodes which are remote from an input port.

Narrowing the focus to communication network applications that have adopted the Internet Protocol, it is important to note that traffic on the Internet is growing very fast. Not only is it expected that within a short time routes within the network will need multiple physical links to support higher transmission rates, but also that there will exist the necessity for bandwidth allocation to different classes of traffic, perhaps for a particular customer or a class of customer. Therefore, the general architecture for future IP-layer large switches will have the traffic buffered at many inputs while waiting for transfer to an output, where the outgoing link will most likely be a logical link consisting of multiple physical links. Indeed, future implementations of routing networks will have input ports connected to output ports that are geographically remote, and where those ports are potentially connected by wide area lossy fabrics.

A particularly important objective to achieve within these future IP-layer networks will be the efficient management of bandwidth allocation and packet discard policies. In other words, the network must ensure that the bandwidth available on an outgoing link be efficiently distributed between all traffic being routed through the switch fabric.

One solution to this problem is the protocol currently used to enforce a given bandwidth allocation for a traffic class, consisting of rate control exerted at the egress ports of the network. Output buffering is provided to allow for the mismatch between aggregate input rates and the assigned output rate. The output buffers take traffic from every input port and schedule the output of the various classes based on their allocation.

The problem with Egress based control of bandwidth is that ideally the output would like to take traffic from all ports as soon as it arrives. This requires that the output port receive traffic at a rate equal to the maximum sum of all the input rates. For large values of N (number of input ports) and input bandwidth rates, this is not economically sound and lower transfer rates are used. This in turn requires that the output port be selective in what traffic it transfers. In particular, the output port will give preference to traffic whose bandwidth allocation has not been satisfied and delay transferring traffic that can not currently be sent. This normally requires that some bandwidth be consumed in allowing output ports to discover the traffic status of input ports. The output buffered model is further complicated when multi-link trunks (logical links) are employed and the bandwidth allocation must be satisfied over the total bandwidth of the logical output port.

Current router designs are also starting to implement more intelligent traffic management policies for bandwidth allocation and packet discard under congestion conditions, for instance the implementation of flow aware discard policies. Unfortunately, the implementation of such policies in the core of a network may prove to be not only expensive but also very difficult. The addition of transport speed management of bandwidth at every node would be prohibitive, requiring that the bandwidth allocation configuration information be repeated at every node, thus complicating queuing structures and scheduling.

The background information herein clearly shows that there exists a need in the industry to provide a method for improving the management of IP-layer bandwidth allocation and packet discard within a lossy data communication network arrangement.

OBJECTS AND STATEMENT OF THE INVENTION

An object of this invention is to provide a novel and improved switch device capable of controlling the transport and discard of data units, such as IP data packets, between the input ports and the output ports of the switch.

Another object of this invention is to provide a novel and improved method for controlling the data units transport and discard process in a switch.

As embodied and broadly described herein, the invention provides a switch for processing data units, said switch including:

- a plurality of input ports, each input port capable of receiving data units;
- a plurality of output ports, each output port capable of releasing data units;
- a lossy switch fabric capable of selectively establishing a plurality of logical pathways between said input ports and said output ports, each logical pathway connecting a certain input port to a certain output port, whereby a data unit received at the certain input port can be transported to the certain output port on the logical pathway between said certain output port and said certain input port;
- a plurality of transport nodes forming points of transfer of data units to and from said switch fabric, whereby each logical pathway passing through said switch fabric includes at least one transport node of said switch fabric;
- a discard control mechanism associated with a certain transport node of said switch for controlling the discard of data units, said discard control mechanism being operative to distinguish and selectively discard data units on a basis of the transport nodes at which the data units have been transferred to said switch fabric.

In a specific example, the switch as defined in general terms above is implemented as a large contained network with a fixed number of inputs and outputs. Such a switch could form a node in an even larger network.

In the example above, the switch comprises three main components: the input/output ports, the switch controller and the switch fabric itself. The input/output ports interconnect the switch to users, other switches and other network elements. Data packets received as inputs are defined as ingress, while packets transmitted as outputs are defined as egress. Examples of such data packets include IP packets, Ethernet frames or, in the case of protocols other than the Internet Protocol, data units with some other arbitrary, proprietary format.

The switch controller provides for both internal and external management of the switch.

The switch fabric itself has the function of transferring data packets between other functional blocks in the switch. For example, user data packets must be routed from the input ports to the output ports, specifically through intermediate transport nodes.

In the example of a switch in the form of a contained network, the switch includes a plurality of access point routers. An access point router provides at least one input/output port pair for the switch. The switch also includes numerous intermediate transport nodes that are instrumental in the transmission of data packets between the access point routers.

The transport nodes and the associated links between them form the switch fabric. In instances where the switch is a contained network, the switch fabric will be referred to in this description as "transport fabric". Each access point router is connected by a physical link to a transport node.

The switch preferably implements two control systems: a bandwidth control system and a discard control system. The discard control system is responsible for controlling the congestion which may occur within the switch via the selective discard of data packets flowing through the switch. The bandwidth control system is responsible for regulating the bandwidth usage of the switch's outgoing links. Since traffic for a particular outgoing link may arrive from any one of the switch's input ports, using different logical pathways within the transport fabric, the bandwidth usage regulation for the outgoing link is actually applied to each logical pathway established in the transport fabric which terminates at the output port for the particular outgoing link. In a specific example, the bandwidth regulation implies assigning priority to data packets.

From a functional point of view, the bandwidth control system can be presented as a collection of bandwidth control mechanisms independent from one another, each associated with a particular logical pathway that can be established within the transport fabric. Each separate bandwidth control mechanism is responsible for the bandwidth usage regulation on its associated logical pathway.

The switch's discard control system is responsible for regulating the discard of data packets within the switch during times of congestion. Specific to the most preferred embodiment of this invention, whereby the switch is in the form of a contained network, the discard regulation is applied at each transport node within the transport fabric.

The discard control system preferably includes a queue set up in the local memory of each transport node. Most preferably, a queue is set up for each transport node of the transport fabric. The queues are independent from one another.

In a specific example, assume that a data packet arrives at the transport node. The packet is then queued by source (entry point in the transport fabric). If the source address does not correspond to a queue already set up, a new queue is dynamically created. Queue congestion is next checked for. If the queue fill is below a threshold setting, all packets arriving for that queue will be accepted. If the queue fill is above the threshold, packets are dropped. The packets discarding is preferably effected on the basis of their priority. For instance, the priority of the packets is examined (the example assumes two possible priority settings, namely HI and LO identified by bit in a particular field of the packet frame). Packets having a setting of LO are discarded, while packets having a priority of HI are kept.

As embodied and broadly described herein, the invention also provides a method for controlling the transport of data units in a switch, said switch comprising:

- a plurality of input ports, each input port capable of receiving data units;
- a plurality of output ports, each output port capable of releasing data units;
- a lossy switch fabric capable of selectively establishing a plurality of logical pathways between said input ports and said output ports, each logical pathway connecting a certain input port to a certain output port, whereby a data unit received at the certain input port can be transported to the certain output port on the logical pathway;
- a plurality of transport nodes forming points of transfer of data units to and from said switch fabric, whereby each logical pathway passing through said switch fabric includes at least one transport node of said switch fabric;
- said method comprising the step of controlling a discard of data units at least in part on a basis of the transport nodes at which the data units have been transferred to said switch fabric.

BRIEF DESCRIPTION OF THE DRAWINGS

FIG. 4 is a configuration table for bandwidth allocation, in accordance with an embodiment of this invention;

DESCRIPTION OF A PREFERRED EMBODIMENT

Figure 1:
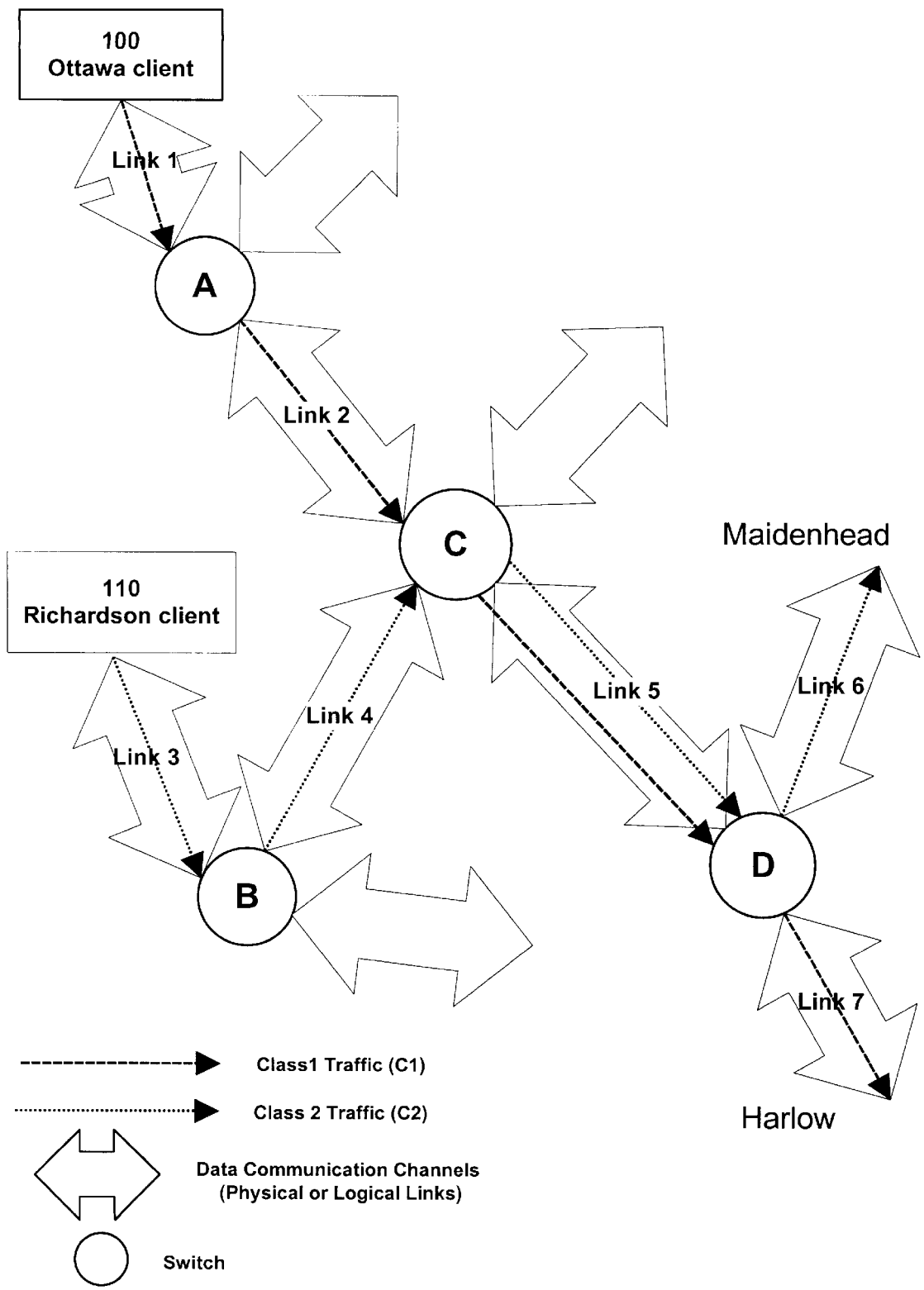
FIG. 1 is a block diagram of a data communications network.

FIG. 1 illustrates an example of a situation where two different classes of traffic travel through a data communications network that has adopted the Internet Protocol (IP) for its internetwork procedures. The two different classes of traffic present are C1 and C2. For a given logical egress port, C1 traffic is always able to use up the reserved amount of allocated bandwidth if it has traffic to send; however, this class is never allowed to use more than the reserved amount even if there is bandwidth available. Similarly, for a given logical egress port, C2 traffic is always able to use up the reserved amount of bandwidth if it has traffic to send; however, if it has more traffic to send it can compete equally with other permitted classes for any available bandwidth, up to a certain maximum amount. In the case of FIG. 1, an Ottawa client 100 is sending traffic of class C1 (reserved bandwidth without overflow) to Harlow, whereas a Richardson client 110 is sending traffic of class C2 (reserved bandwidth with overflow) to Maidenhead. Client 100 traffic must travel on links 1, 2, 5 and 7, through switches A, C and D. Client 110 traffic must travel on links 3, 4, 5 and 6, through switches B, C and D. Therefore, the two streams of data overlap on link 5, flowing through switches C and D.

The switches which form a communications network may be simple routers, but they may also be large contained networks with a fixed number of inputs and outputs. Regardless, in the most basic sense, a switch comprises three main components: the input/output ports, the switch controller and the switch fabric itself. The switch controller may comprise a single central controller for the entire switch or, alternatively, may be in the form of a distributed control system with local controllers for each input port and a separate fabric controller for the switch fabric.

The input/output ports interconnect the switch to users, other switches and other network elements. Data packets received as inputs are defined as ingress, while packets transmitted as outputs are defined as egress. Examples of such data packets include IP packets, Ethernet frames or, in the case of protocols other than the Internet Protocol, data units with some other arbitrary, proprietary format.

The switch controller, either a central or distributed system, provides for both internal and external management of the switch, including data unit processing and the coordination of connections through the switch, as well as traffic, configuration and accounting management.

The switch fabric itself has the function of transferring data packets between other functional blocks in the switch. For example, user data packets must be routed from the input ports to the output ports, possibly through intermediate transport nodes in the case where the switch is actually a contained network. The physical architecture of the switch fabric depends on the amount of traffic to be carried as well as the switch's location within the network. Examples of switch fabric taxonomy fall into two main categories, notably time division multiplexed (TDM) fabrics and space division multiplexed fabrics (SDM). The former category includes either a shared memory design or a shared medium design. The latter category may be either a single path design or a multiple path design. As the physical taxonomy and implementation of switch fabric is well known to those skilled in the art, it will not be described in detail.

In FIG. 1 each switch is a contained network with a fixed population of inputs and outputs. The data units being routed through the communications network are actually IP data packets, and will be referred to as such in the remainder of the description. Each of the switches A, B, C, and D include a plurality of access point routers, which themselves each include one input/output port pair for the switch.

Figure 2:
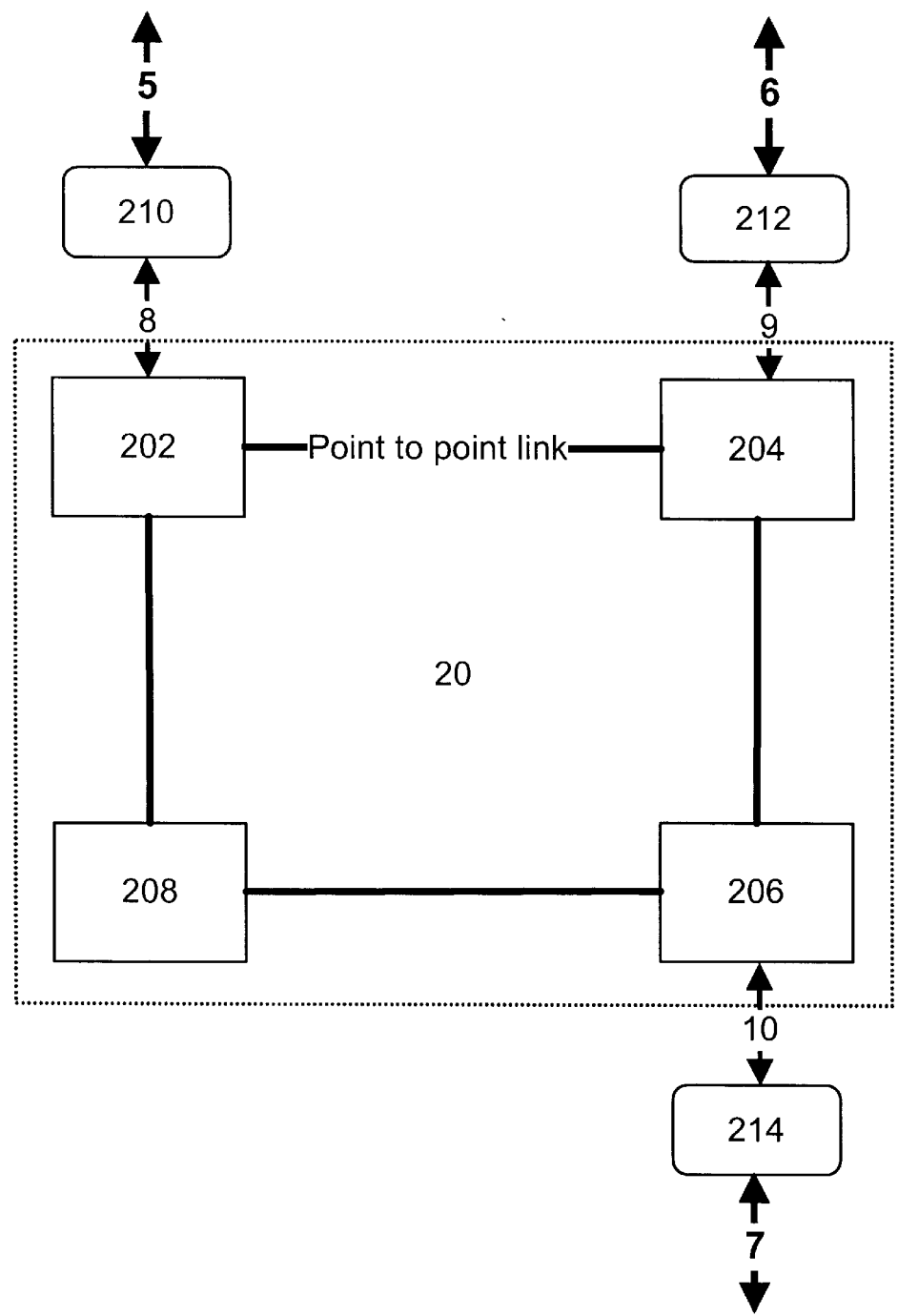
FIG. 2 is a block diagram of a switch in accordance with the invention.
Figure 2:
Figure 2:
Figure 2:

FIG. 2 illustrates the layout of any one of the four switches shown in FIG. 1, such as switch D. Each access point router (210, 212, 214) is connected by a physical link (8,9,10) to a transport node (202, 204, 206, 208). The transport nodes are set up in a store and forward ring architecture (shared medium) with point to point links connecting the nodes, whereby this ring of nodes makes up the overall switch fabric of the contained network, hereafter referred to as the transport fabric.

In a most preferred embodiment of this invention, the switch controller is a distributed control system, with a local controller at each access point router. The local controllers are responsible for the data handling and queuing, as well as the configuration and accounting management which determines the priority setting of the data queues and packets. The local controllers are also responsible for supporting priority such as to move traffic from high priority requests before traffic from low priority requests.

The switch also includes two control systems: a bandwidth control system and a discard control system. The discard control system manages the data packet congestion which may occur within the switch, either at the input ports of the switch or within the transport fabric itself, through the regulated discard of data packets, and will be described in more detail below. The bandwidth control system is responsible for regulating the bandwidth usage of the switch's outgoing links. Since traffic for a particular outgoing link may arrive from any one of the switch's input ports, using different logical pathways within the transport fabric, the bandwidth usage regulation for the outgoing link is actually applied to each logical pathway established in the switch fabric which terminates at the output port for the particular outgoing link.

Figure 10:
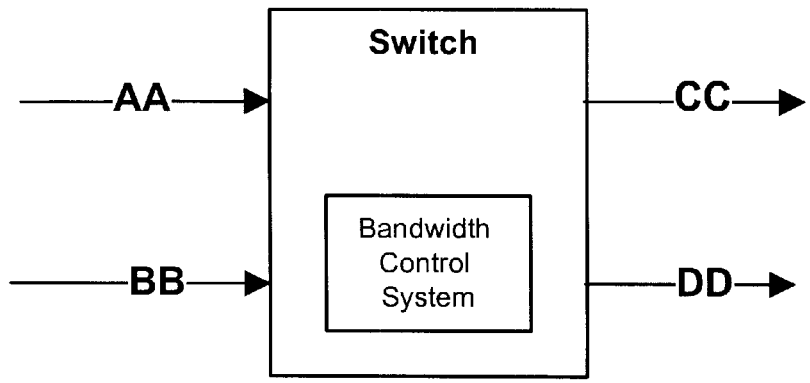
FIG. 10 is a block diagram representing a functional point of view of the bandwidth control system in accordance with this invention.
Figure 10:
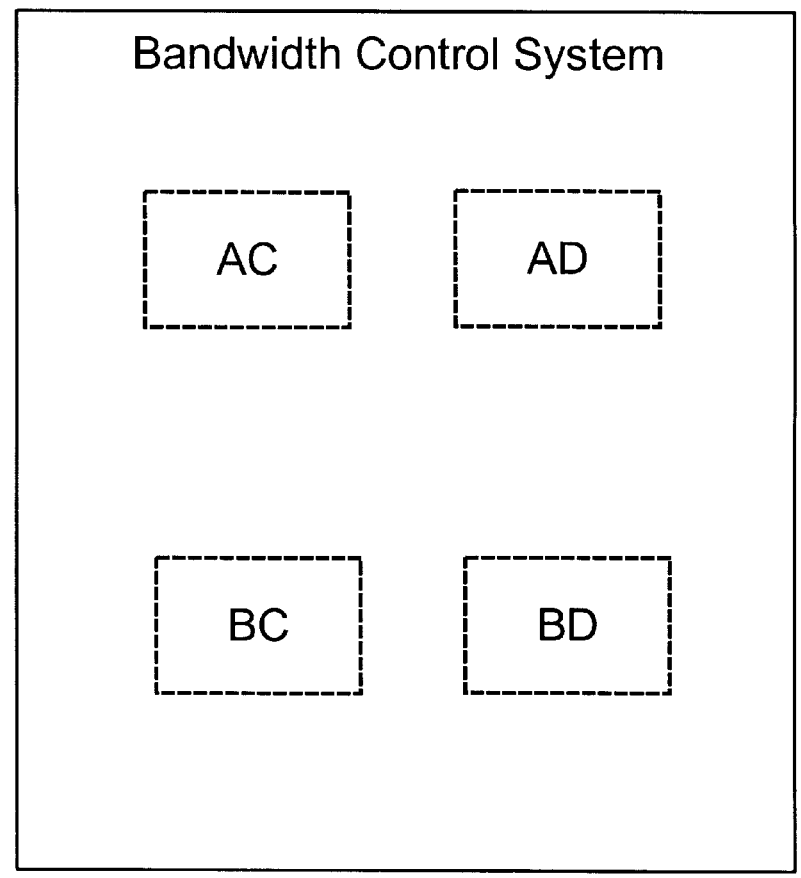
Figure 10:

From a functional point of view, the bandwidth control system can be presented as a collection of local bandwidth control mechanisms independent from one another, each associated with a particular logical pathway that can be established within the transport fabric. Each separate bandwidth control mechanism is responsible for the bandwidth usage regulation on its associated logical pathway. FIG. 10 represents a functional point of view of the bandwidth control system for a switch with two input ports AA and BB, and two output ports CC and DD. There are four possible logical pathways through the transport fabric, specifically AA to CC, AA to DD, BB to CC and BB to DD, each represented by its own bandwidth control mechanism, respectively AC, AD, BC and BD.

Figure 3:
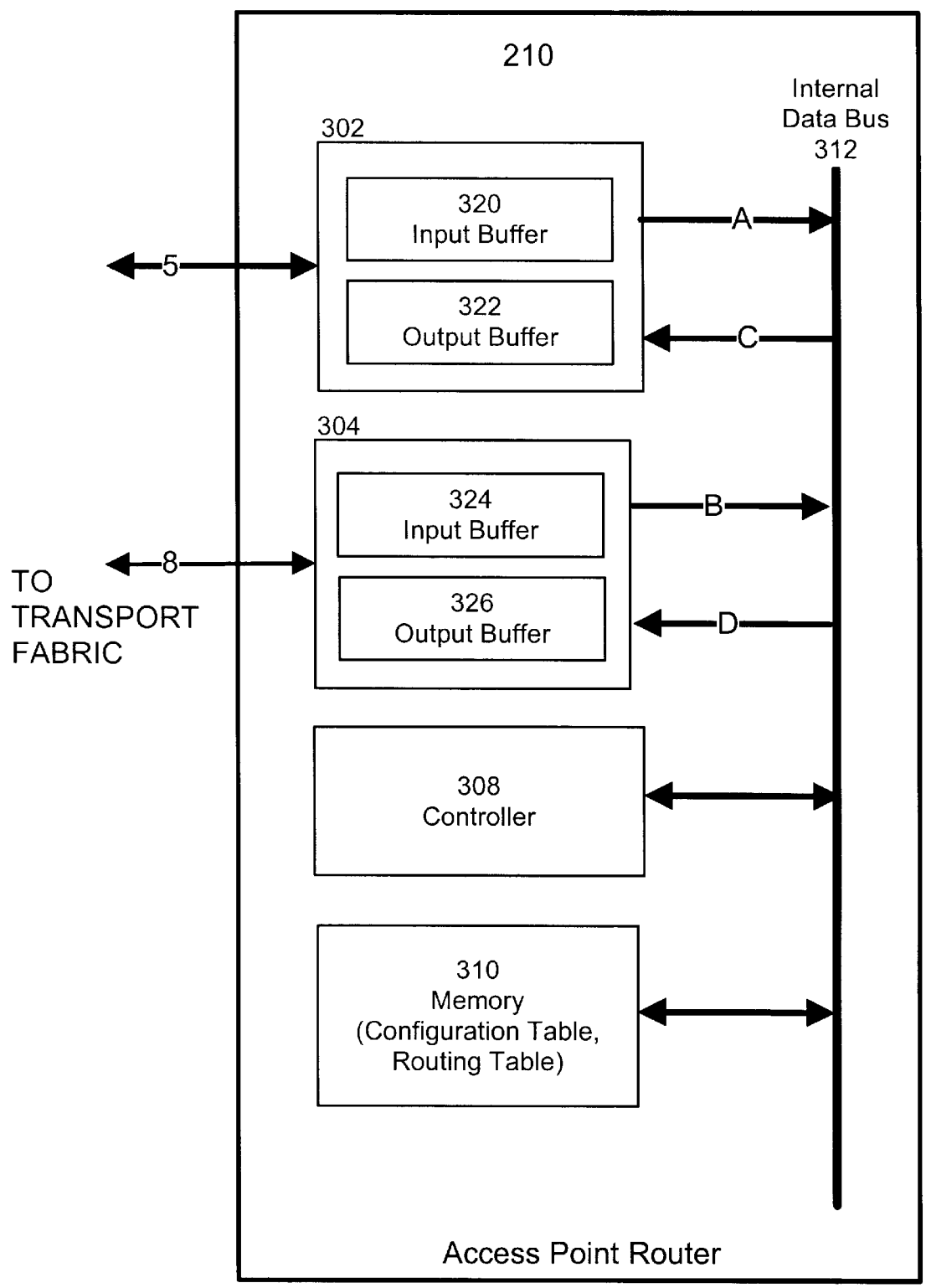
FIG. 3 is a block diagram of an access point router in accordance with the invention.

The structure of an access point router constructed in accordance with the present invention is shown in FIG. 3. More specifically, the diagram illustrates access point router 210 at switch D, which is comprised of interfaces 302 and 304, a controller 308 and a memory 310. An internal data bus 312 interconnects these components, enabling data and control signals to be exchanged between them. The access point router has 4 ports, identified as port A, port B, port C and port D. Two of these ports connect the access point router to physical link 8, specifically port B and port D, allowing data to be passed to and received from local transport node 202 for routing over the transport fabric within the contained network. The other two ports belong to the contained network's fixed population of inputs and outputs, connecting the access point router to physical link 5, allowing data to be transported to and from other switches within the large network seen in FIG. 1.

The structure of access point routers 212 and 214 is identical to that shown in FIG. 3 for access point router 210, except that links 5 and 8 become links 6 and 9 for access point router 212 and links 7 and 10 for access point router 214. Similarly, ports A, B, C and D become ports E, F, G and H for access point router 212 and ports I, J, K and L for access point router 214.

The interfaces 302 and 304 interconnect the access point router to the physical links 5 and 8. These interfaces are of standard design. On the input side their function is to transmit incoming data packets to the internal data bus 312 for transport to the memory 310 where they can be processed by the controller 308. On the output side, the interfaces are designed to accept data packets from the memory 310 through the data bus 312 and impress the necessary electrical signals over the respective physical link so that the signal transmission can take effect and the data packets can be sent over the transport fabric or towards other switches. It is not deemed necessary to discuss this standard transmission operation of the interfaces in more detail because it is well known to those skilled in the art and is not critical to the success of the invention.

The interfaces 302 and 304 include input buffers 320 and 324 respectively, which are memory spaces of the FIFO type that can hold incoming data packets received from a physical link. The purpose of the buffers is to provide a temporary storage mechanism for holding the incoming data packets until a decision is made by queuing and routing logic as to how those packets are to be handled. The interfaces also include output buffers 322 and 326 respectively, which are also memory spaces of the FIFO type that can hold egress data packets to be output on a physical link.

The memory 310 contains a program element that controls the operation of the access point router. That program element is comprised of individual instructions that are executed by the controller 308 that is in the form of a Central Processing Unit (CPU) as will be described in detail below. The memory holds the usual routing table that maps the destination addresses of incoming data packets to the switch output ports. It is not deemed necessary to discuss in detail the structure of the routing table here because this component is not critical for the success of the invention and also it is well known to those skilled in the technological field to which the present invention belongs. The memory also provides random access storage capabilities for holding data elements such as data packets that the controller 308 processes during the execution of the program. Finally, the memory contains a static configuration table of egress bandwidth allocation, referenced by the controller 308 during program execution.

The memory 310 implements queue mechanisms, analogous to buffers, to accept data from the input ports. The memory 310 is merely the medium on which the buffers are created. The actual creation and management of the queues is effected by the controller 308. The queues form a component of the switch's bandwidth control system. Based on the contents of a mapping table also held in memory, the controller 308 will dynamically create queues within memory to hold all the traffic for each particular class traveling through the transport fabric on a different logical pathway towards a particular switch output port. Specific to the example depicted in FIG. 1, the access point router 210 has two queue buffers set up in memory 310 as a result of the two different classes of traffic arriving on physical link 5.

The access point router 210 has the ability to identify between different classes of traffic, determine the traffic's intended logical pathway through the transport fabric and, on the basis of both of these characteristics, load the data packets accordingly in the queues. The traffic in each queue class is accounted for and, as a result, the priority of the different queues and their associated data packets is set before making a transmission request to the transport fabric. The controller 308 recognizes the different queue priorities and accordingly determines and sets the transmission schedule of data packets being released from the queues to the transport fabric, which finally routes the data packets over their logical pathway to their corresponding output port.

Figure 7:
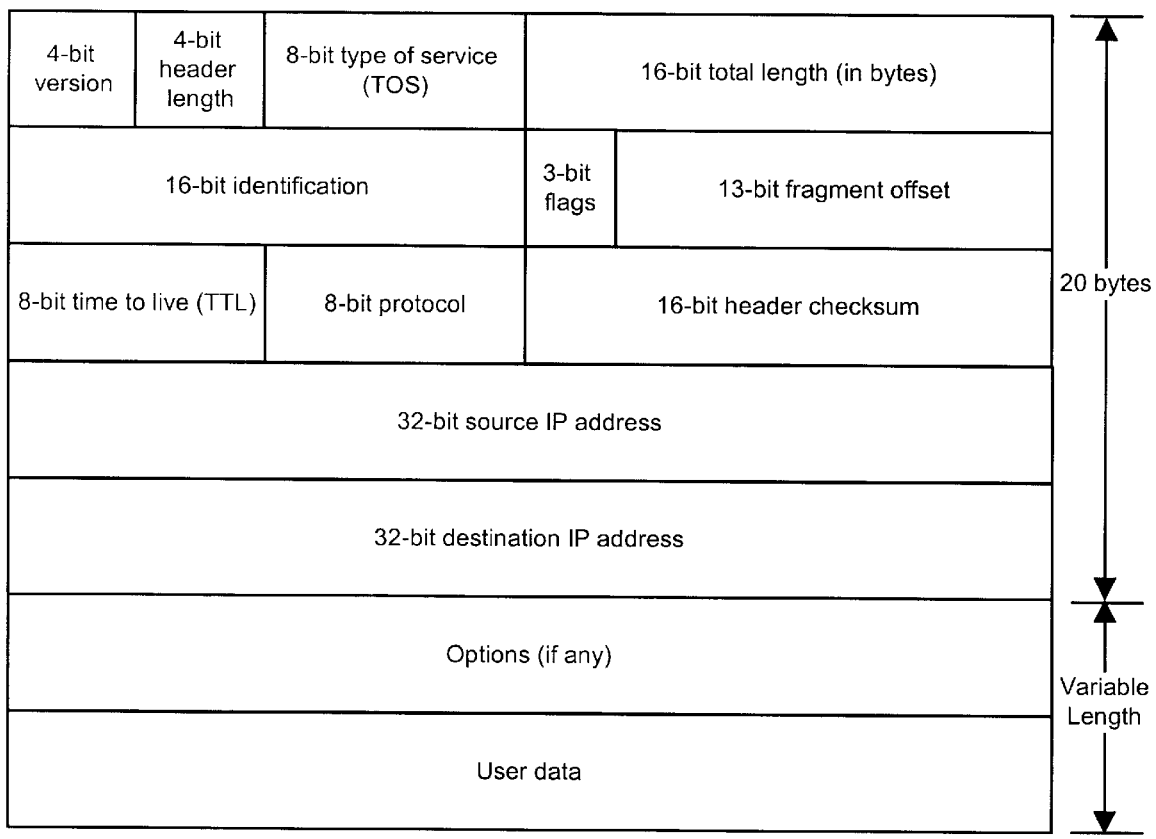
FIG. 7 is a diagram showing the format of an IP data packet.

In the example shown in FIG. 1, priority-based bandwidth allocation can be used at any of the switches in order to allocate outgoing link bandwidth between the two classes of traffic. Assume for the sake of discussion that a certain IP data packet of type C1 arrives at access point router 210 of switch D, having been sent from switch C. As the packet is traveling on the physical link 5, it will arrive at the input port A (interface 302). The IP packet is placed in the input buffer 320 and the logic invoked to determine which class of traffic the data packet belongs to, as well as toward which switch output port the IP data packet is to be transported. This is effected by reading the corresponding fields in the IP data packet header, depicted in FIG. 7. The routing table is then scanned in order to determine the output port of the switch assigned to the destination address read from the header (in most cases this output port will reside on a different access point router of the switch C. In this case assume that the output port is connected to physical link 7, notably output port K. This port is not shown in FIG. 3 as it corresponds to a different access point router, specifically router 214.

At this point, both the entry transport node to the transport fabric ring, or ring source address, and the exit transport node of the transport fabric ring, or ring destination address, can be derived. Specific to the this example, the ring source is port D on access point router 210, while the ring destination is port J on access point router 214. These parameters are added to the data packet as extra tags, to be used by the transport nodes for forwarding of the packets.

The IP data packet is next transferred from the input buffer 320 to a queue set up in memory 310. An accounting operation is effected in order to determine the queue's output rate, achieved over an averaging period. The accounting operation is implemented through an algorithm for calculating average bandwidth used over time. Many such algorithms exist and they will not be described in detail, as they are well known to those who are skilled in the art. The result of the accounting operation is then compared to the values of the minimum and maximum allocated bandwidth for traffic traveling through the transport fabric over the logical pathway joining input port A to output port K of the switch.

The allocated bandwidth values for the different logical pathways are settings stored in the configuration table within the memory 310. FIG. 4 shows the configuration table for this example, where the bandwidth available on the outgoing link at output port K has been distributed between, and allocated to two logical pathways which connect output port K to two input ports A and E located at the switch's other access point routers. The diagram shows that the input ports A and E have minimum allocated bandwidths of 3 Mb/s and 5 Mb/s, respectively. The same two ports have maximum allocated bandwidths of 3 Mb/s and 10 Mb/s, respectively. Although spare bandwidth is not available to C1 traffic, it is available to C2 traffic traveling on logical pathways through switch D, in which case the spare bandwidth would be competed for by the various types of C2 traffic, limited by the maximum allocated bandwidth settings for each logical pathway.

Based on the comparison between the accounting value and the bandwidth settings, a priority setting is established for the queue associated with the logical pathway between ports A and K, either HI or LO. If the accounting result is less than its minimum bandwidth, in this example 3 Mb/s, the queue's priority will be HI. If the accounting result shows that the queue's traffic flow has reached its minimum bandwidth, the queue's priority will be LO, until the flow reaches its maximum bandwidth, also 3 Mb/s as this is C1 traffic, at which point the controller 308 will stop sending requests to the transport fabric for releasing IP data packets from this particular queue.

It is important to note that since C1 traffic has reserved bandwidth without overflow, its minimum bandwidth is also its maximum. Consequently, once a C1 queue accounts for an output rate of traffic equal to the minimum bandwidth allocated no more IP data packets are released from the queue. This differs from C2 traffic, which has reserved bandwidth with overflow, because a C2 queue which accounts for an output rate of traffic equal to the minimum bandwidth allocated can continue competing for spare bandwidth with other C2 queues until it reaches its constraining maximum. When competing for spare bandwidth, a queue will have a LO priority setting.

Once the queue's priority setting has been established, its outgoing packets are tagged to reflect the queue's priority status, through the state of a single bit in the packet header. If the bit is set, the data packet is being sent with HI priority; if the bit is cleared, the data packet is being sent with LO priority. Alternatively, the priority could be set through a multi-bit code point added outside of the original packet as an extra tag, together with the ring source and destination information.

The controller 308 will schedule data packet transmission for the various queues so as to move traffic from HI priority requests before traffic from LO priority requests, as a LO request indicates that the queue traffic in question has already used up its minimum allocated bandwidth fraction on its logical pathway. Before actually releasing an IP data packet from a certain queue to the transport fabric, the controller 308 must wait for a message from the access point router's local transport node, indicating whether its local source queue threshold has been reached or not, to be described below in greater detail. For the moment suffice it to say that this message regulates the rate of IP data packets release from the access point router to the transport node. This regulation mechanism is not concerned with the priority status of the IP data packets. The message that the controller 308 expects from the transfer node is either send more IP data packets or stop sending IP data packets. When IP data packets can be sent to the transport node the controller 308 is responsible for determining which packets to send first by using the bandwidth control mechanism described earlier.

Assume that the message send by the transport node to the controller 308 of the access point router indicates that the threshold has not been reached, thus more IP data packets can be sent toward the transport node. The controller 308 will first transmit HI priority data packets to the local transport node. Only if there are no HI priority packets for transmission, and the transport node's local source queue threshold has not been reached, will the controller 308 transmit LO priority data packets to the local transport node. The controller 308 uses a round-robin scheduling policy to schedule packet release permissions for LO request traffic queues, as this ensures equal competition between all of these queues for any available spare bandwidth. If the local source queue threshold has been reached, and the queue remains full for some extended period of time, the access point router may experience its own queue congestion and be forced to implement a discard policy of some sort, based on random selection, data type or packet age, among many others. Such policies are well known to those who are skilled in the art, and will not be described in more detail.

Figure 5:
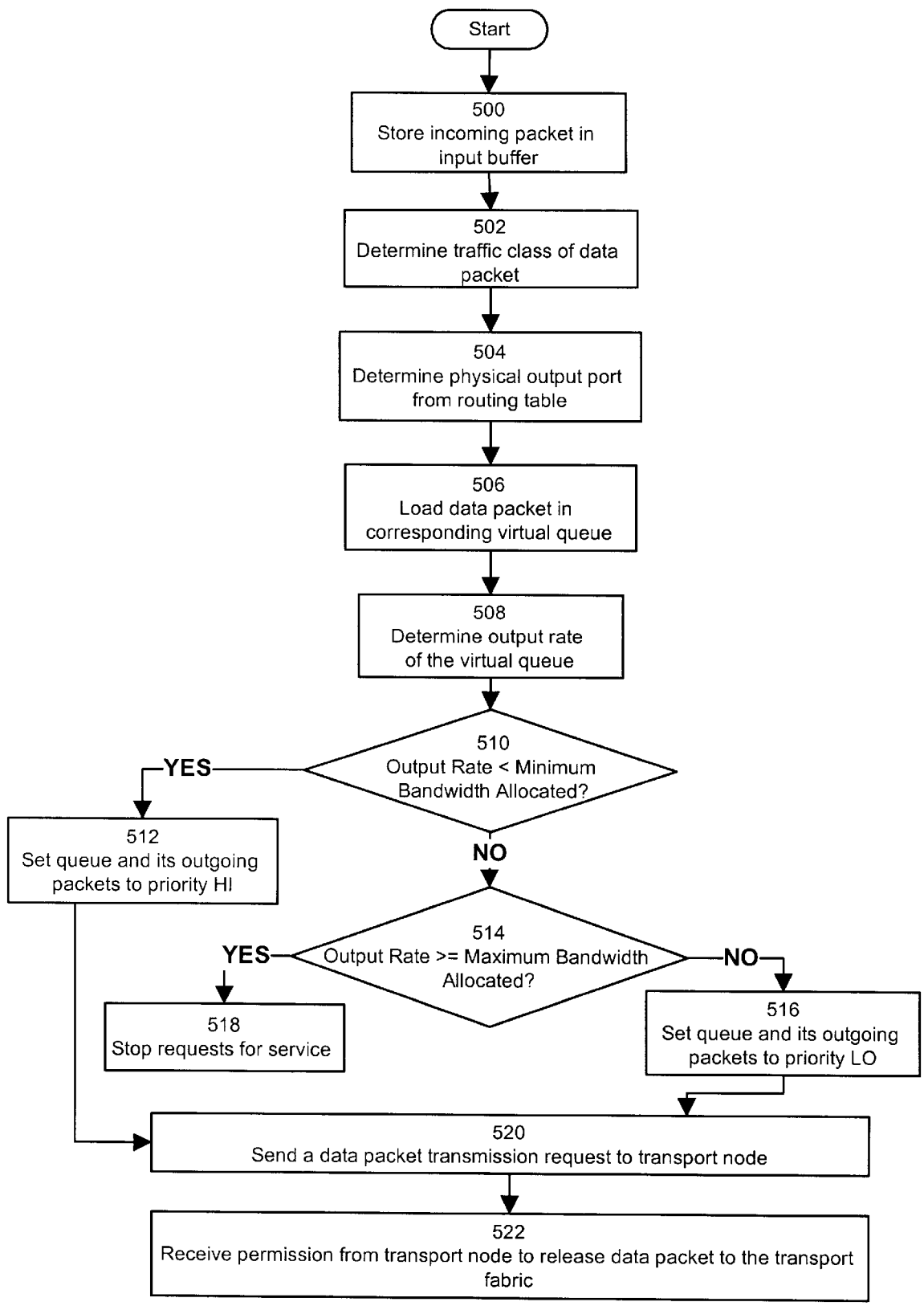
FIG. 5 is a flowchart illustrating the operation of a program element in the access point router depicted in FIG. 2, which controls the priority setting of data packets being transmitted through the transport fabric.

FIG. 5 provides a complete flowchart illustrating more detailed example of the operation of the program element stored in the memory 310, and executed by the controller 308, that regulates the operation of the access point router, in particular the priority setting of queues based on their output rate. At step 500 the access point router receives an IP data packet. Assume that the IP data packet is received at input port A of interface 302, and placed in the input buffer 320. Control is then passed to the identification logic of the program stored in the memory 310 and executed by the controller 308, as illustrated by step 502, whereby the class of the IP data packet is determined to be C1 by reading the type of service (TOS) field in the IP data packet header, seen in FIG. 7. Next, control is passed to the routing logic of the program at step 504. The routing logic reads the destination address of the IP data packet from the destination address field in the header and consults the routing table stored in the memory 310. The table indicates the address of the switch output port through which the IP data packet is to be dispatched so as to reach the desired destination. Both ring source (entry transport node) and ring destination (exit transport node) addresses can now be derived from knowledge of the switch input and output ports involved in the data packet transmission. These two parameters are added as extra tags to the data packet and will be used by the transport fabric to deliver the IP data packet to the proper access point router and also to implement discard policies based on input address to be described in detail later.

Figure 6:
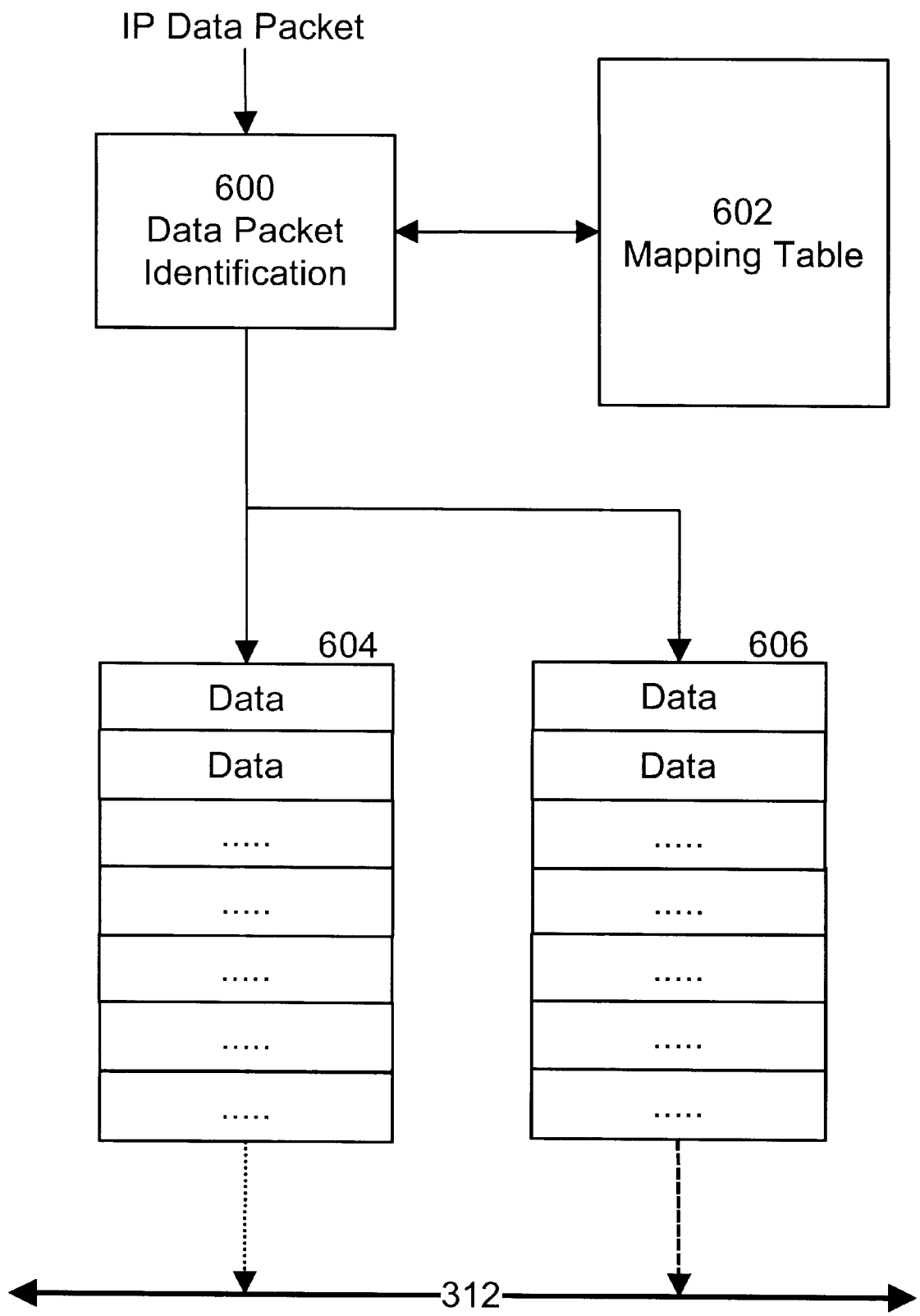
FIG. 6 is a high-level block diagram of the identification/queuing mechanism implemented in the access point router in accordance with this invention.

At step 506, the program element transfers the IP data packet to its corresponding queue by consulting a mapping table held in memory. The block diagram of this mechanism is shown in FIG. 6. The portion of the program element (functional block 600) responsible to effect the IP data packet identification reads a table 602 that maps variables traffic class, input port and output port, to a particular queue. Each particular class of traffic going to a particular output port requires its own queue. If, upon consultation, the three variables do not correspond to a queue already set up in memory, a new queue is dynamically created. Specific to the example described above, queue 604 is set up for C1 traffic arriving at input port A and going to output port K, and queue 606 is set up for C2 traffic arriving at input port A and going to output port G.

Returning back to FIG. 5, the program element then determines the output rate of the queue at step 508 and, at step 510, compares this measured value to the queue's minimum and maximum allocated bandwidth values, as found stored in a configuration table in the memory 310. Based on the result of the comparison, the queue's priority is set to either HI at step 512, or LO at step 516. The controller 308 makes a request for data packet release to the transport node and if an authorization is received the IP data packet is passed from the queue to the physical link 8. At step 522, a message arrives from the transport node authorizing the release of a data packet. The controller 308 then releases a data packet from queue 604 to the transport fabric. The packet will therefore be sent over physical link 8 to the local transport node. The transport fabric itself will route the packet over its logical pathway to the appropriate output port, in this case output port K at access point router 214.

The negotiation between the controller 308 and the transport node is effected to regulate the amount of data passed from the access point router to the associated transport node. In the example given above for each data packet a specific authorization is sought by the controller 308. Other possibilities also exist. The transport node may be configured to remain silent when it can accept IP data packets and issue a control message when data can no longer be accepted. Under this form of construction, the steps 520 and 522 are not implemented and they are replaced by a single step where the controller 308 simply determines if a stop message exists and in the negative the selected IP data packet is released to the transport fabric.

The transport fabric formed by the store and forward ring of nodes seen in FIG. 2 is responsible within the contained network for actually routing the data packets to their destination. The implementation of this function is made much simpler by the fact that the fabric is no longer required to concern itself with egress bandwidth allocation. In the ring topology, the transport fabric comprises a set of transport nodes in the form of repeaters 202, 204, 206 and 208 joined by point-to-point links in a closed loop. A repeater is capable of receiving data on one link and transmitting it, bit by bit, on the other link. The links are unidirectional; that is, data packets are transmitted in one direction only. Every transport access point router is attached to the network at a transport node repeater, which allows for data insertion to the transport fabric and data reception from the transport fabric.

The switch implements a discard control system that is responsible for regulating the discard of data packets within the switch during times of congestion. Specific to the most preferred embodiment of this invention, whereby the switch is in the form of a contained network, the discard regulation is applied at each transport node within the transport fabric.

The discard control system structurally includes one or more queues set up in the local memory of each transport node and the associated control components. From a functional point of view, the discard control system can be presented as a collection of discard control mechanisms implemented on each transport node. The control mechanisms on a transport node are independent from one another. For instance, in the example of the switch illustrated at FIG. 2, the switch implements four separate discard control mechanisms, one on each transport node. Each control mechanism can in turn distinguish IP data packets on the basis of source address and implement an independent discard control based on source address. In other words, the discard control mechanism on the transport point 202 is effecting discard control on IP data packets arriving from access point router 210, and discard control on IP data packets input to the transport fabric at transport entry nodes 204, 206 and 208, respectively.

Figure 8:
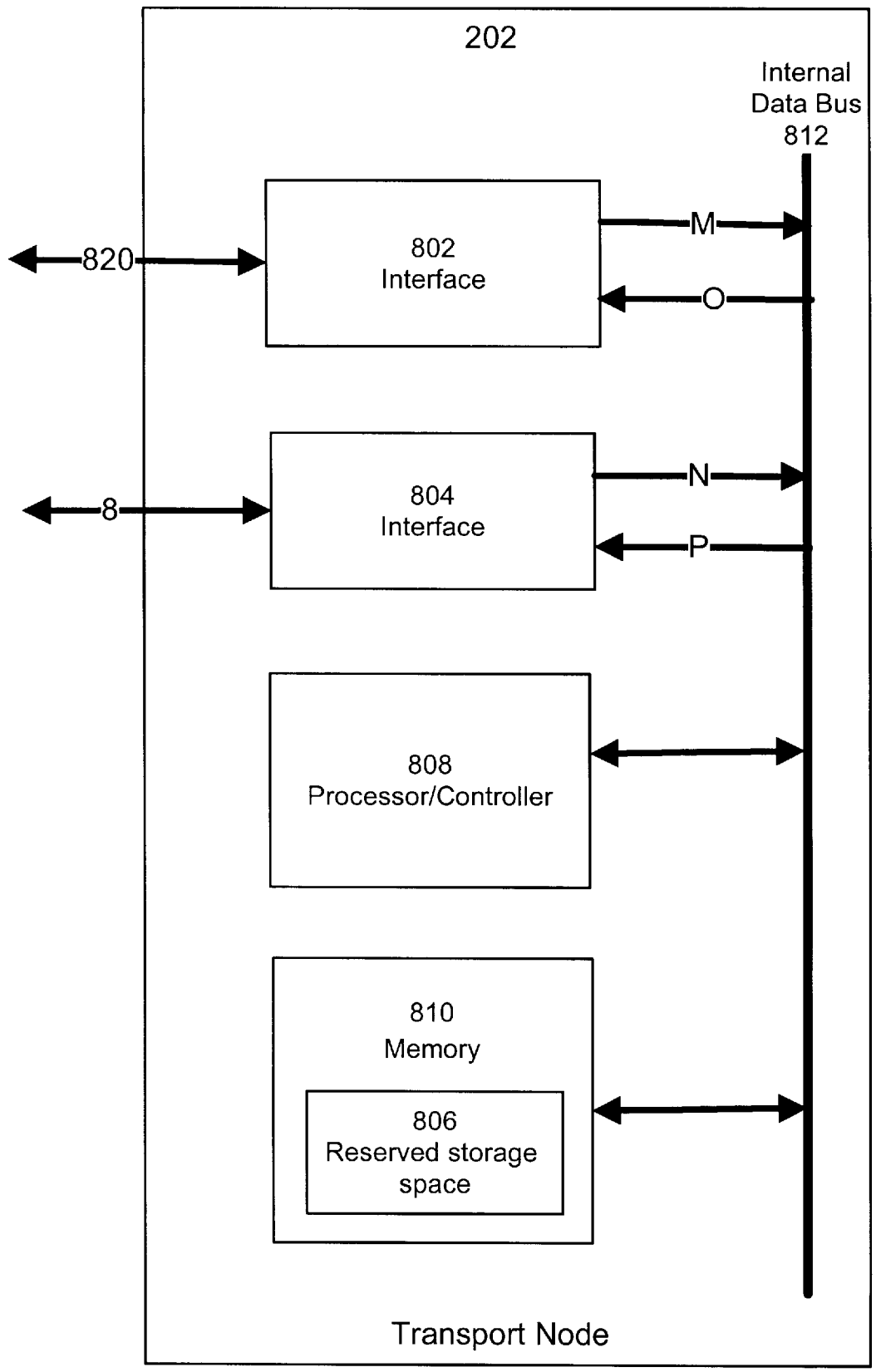
FIG. 8 is a block diagram of the structure of a transport node (repeater) in accordance with this invention.

The structure of a transport node (repeater) constructed in accordance with the present invention is shown in FIG. 8, specifically transport node 202. Similarly to the access point router 210, the repeater 202 is comprised of interfaces 802 and 804, a controller 808 and a memory 810. An internal data bus 812 interconnects these components, enabling data and control signals to be exchanged between them. The repeater has 4 ports, identified as port M, port N, port O and port P. These ports connect the repeater to physical link 820, used for incoming and outgoing ring traffic, as well as to physical link 8, used for traffic traveling from and to the local access point router 210. In FIG. 8, ports M and N are input ports on the physical links 820 and 8 respectively, while ports O and P are output ports on the same two links.

The major difference between memory 810 and memory 310 is that the repeater memory 810 does not contain a routing table. It does however contain a threshold setting and provides a storage space 806, to be described below. The interfaces 802 and 804 have the same responsibilities as described earlier for the access point router 210 interfaces.

The storage space 806 implements queues in the form of buffers, used to store new traffic being put on the ring as well as other ring traffic arriving from upstream ring nodes, waiting to be forwarded downstream. One preferred type of memory space organization is the FIFO type.

The controller 808 executes a program element stored in memory 810, to be described below. The controller 808 provides a number of functions, one being a ring queue scheduler for the transport node, responsible for setting up different queues, each queue to hold all the traffic originating from a particular source, including a local source queue for traffic arriving from the transport node's local access point router, and also for the release of outgoing packets onto the ring and the discard of packets as a result of congestion. In addition, the controller is responsible for informing the local access point router of whether or not the local source queue threshold has or has not been reached. This function is illustrated by the steps 520 and 522 of the flow chart at FIG. 5.

The threshold setting stored in memory 810 limits the amount of fill allowed for all of the source queues. It is used by the controller 808 as a comparison reference, in order to determine whether or not congestion is occurring and packet discard is required by any of the source queues. In a specific example, the source queue size could be set to be several times larger than this threshold setting.

Figure 9:
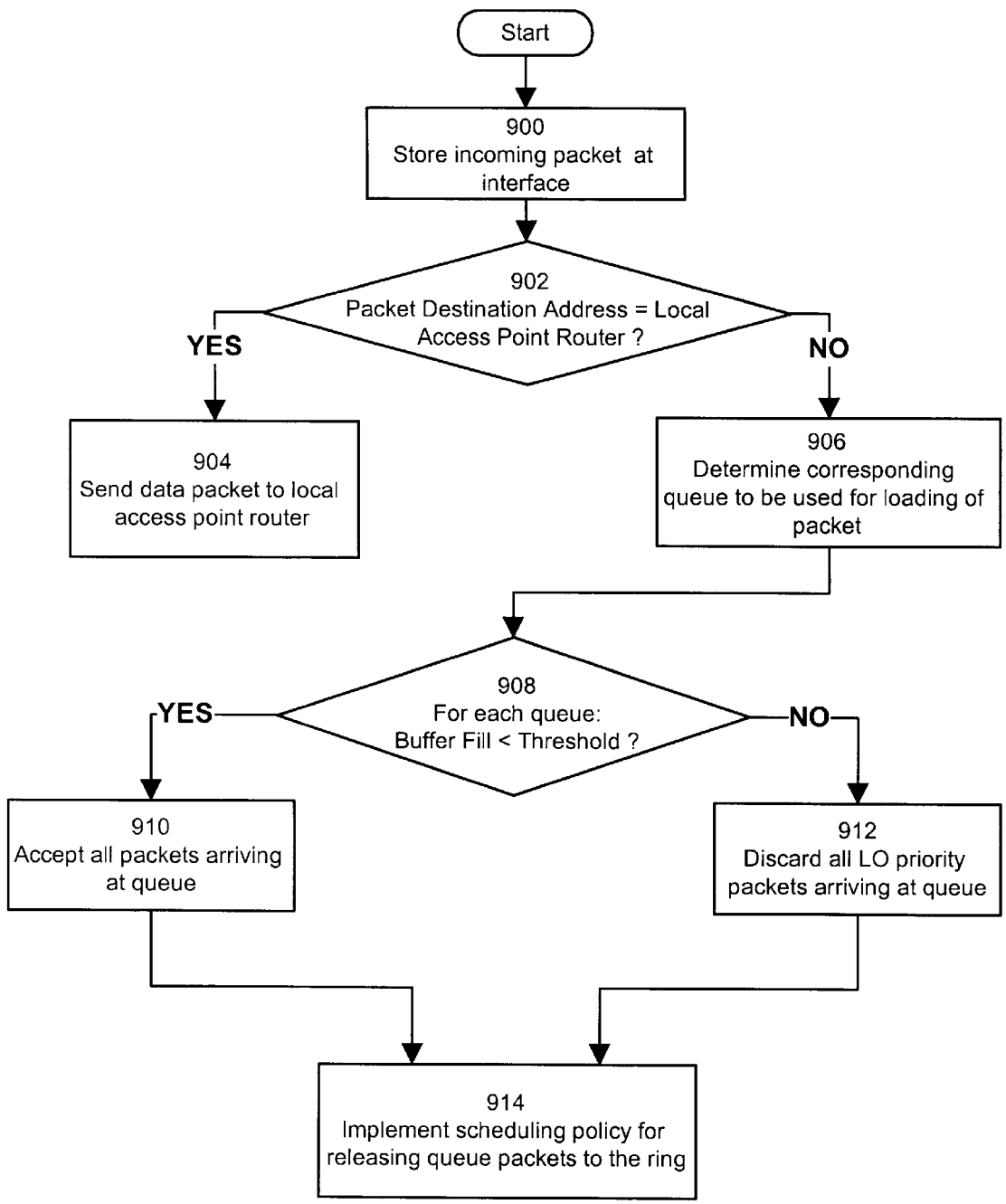
FIG. 9 is a flowchart illustrating the operation of a program element in the transport node depicted in FIG. 9, which controls packet discard when congestion occurs within the transport fabric.

FIG. 9 illustrates in greater detail the packet discard mechanism implemented by any one of the transport nodes, specifically the operation of the program element stored in the memory 810, and executed by the controller 808. At step 900 a data packet arrives at the transport node. Assume that the packet is incoming traffic from the ring, and therefore arriving at port M of interface 802. At step 902 both the ring source and destination addresses of the data packet are read from the tags, originally added to the data packet by an access point router. The controller 808 determines whether the packet is to continue on the ring, or whether it is traffic for the local access point router. Assume that the data packet is found to have a destination address different from that of the local access point router, in other words it is to continue on the ring. The packet is queued by source within the transport node's reserved storage space 806, and the queue to be used for loading of the packet is determined at step 906. If the source address does not correspond to a queue already set, a new queue is dynamically created. Control next passes to the discard control system and each queue is checked for congestion at step 908. If the buffer fill is below the threshold setting indicated by the threshold table held in memory 810 and associated with that particular queue, all packets arriving for the queue will be accepted at step 910. If the buffer fill is above the threshold, all arriving packets with a priority setting of LO are discarded at step 912. If the overall allocation of the guaranteed bandwidth available on outgoing links from the switch has been done conservatively, there will be no need to discard arriving HI priority traffic.

It is also at step 908 that the transport node will notify the local access point router that the corresponding queue has reached its threshold or not. This message is sent (in the form of a refusal to accept further IP data packets) when the controller 308 issues a request to release an IP data packet. It should be appreciated that the actual discarding of IP data packets from the local access point router does not occur at the transport node but rather at the access point router itself. The discard control, however, is still with the transport node. In contrast, for IP data packets from other access point routers the actual discard occurs at the transport node.

At step 914, the controller 808 determines which queue to release data packets from. The policy consists simply of checking for the queue with the most data packets of priority HI and forwarding traffic from that queue first. If no queues contain HI priority traffic, or all queues contain the same amount of HI priority traffic, a round robin schedule is implemented for releasing the packets.

In an alternative embodiment, the ring queue scheduler of a particular transport node does not give priority to the queue with the most HI priority packets, but rather serves the longest queue first. Both implementations have almost the same effect, with all LO priority packets being discarded in the case of a buffer fill which is greater than the buffer threshold.

The above description of a preferred embodiment under the present invention should not be read in a limitative manner as refinements and variations are possible without departing from the spirit of the invention. The scope of the invention is defined in the appended claims and their equivalents.

We claim:

1. A switch for processing data units, said switch including:
   a plurality of input ports for receiving data units;
   a plurality of output ports for releasing data units;
   a lossy switch fabric for selectively establishing a plurality of logical pathways between said input ports and said output ports, each logical pathway connecting a certain input port to a certain output port, whereby a data unit received at the certain input port is transported to the certain output port on the logical pathway between said certain output port and said certain input port;
   a plurality of transport nodes forming points of transfer of data units to and from said switch fabric, whereby each logical pathway passing through said switch fabric includes at least one transport node of said switch fabric;
   a discard control mechanism associated with a certain transport node of said switch for controlling the discard of data units, said discard control mechanism comprising a queue for storage of data units flowing through the certain transport node associated with said discard control mechanism, said discard control mechanism being operative to distinguish and selectively discard data units on a basis of the transport nodes at which the data units have been transferred to said switch fabric.

2. A switch as defined in claim 1, wherein said switch is a contained network.

3. A switch as defined in claim 2, wherein said discard control mechanism effects discard control on data units transferred to said switch fabric at a first transport node independently from the discard control on data units transferred to said switch fabric at a second transport node.

4. A switch as defined in claim 3, wherein said switch includes a discard control mechanism associated with each transport node of said switch.

5. A switch as defined in claim 4, wherein each discard control mechanism regulates the discard of data units at a transport node independently from the regulation of data unit discard at a different transport node.

6. A switch as defined in claim 3, wherein said discard control mechanism includes a queue for each transport node from which data units are introduced in said switch fabric and reach the certain transport node that is associated with said discard control mechanism.

7. A switch as defined in claim 6, wherein said discard control mechanism includes a controller to control the introduction of data units in the respective queues.

8. A switch as defined in claim 7, wherein said controller implements a first functional block to read a selected field of a frame of a certain data unit to determine the transport node at which the certain data unit has been introduced in said switch fabric, and to locate a queue associated with the transport node at which the certain data unit has been introduced in said switch fabric.

9. A switch as defined in claim 8, wherein said controller implements a second functional block to establish a level of fill of the queue associated with the transport node at which the certain data unit has been introduced in said switch fabric.

10. A switch as defined in claim 9, wherein said second functional block is capable to discard the certain data unit when the level of fill of the queue associated with the transport node at which the certain data unit has been introduced in said switch fabric is above a threshold.

11. A switch as defined in claim 10, wherein said second functional block reads priority data in a frame of the certain data unit and utilizes said priority data in determining whether or not to discard the certain data unit when the level of fill of the queue associated with the transport node at which the certain data unit has been introduced in said switch fabric is above the threshold.

12. A switch as defined in claim 11, wherein the priority data in the frame of the certain data unit is indicative of at least two priority levels, namely a first level of priority and a second level of priority, the first level of priority being higher than the second level of priority, said second functional block effecting discard of the certain data unit when the priority data is indicative of the second level of priority and the level of fill of the queue associated with the transport node at which the certain data unit has been introduced in said switch fabric is above the threshold.

13. A switch as defined in claim 12, wherein said controller implements a third functional block to schedule the release of data units from the queues containing data units toward remote transport nodes of said switch fabric.

14. A switch as defined in claim 13, wherein the transport nodes of said switch fabric are connected in a store and forward ring architecture.

15. A switch as defined in claim 14, wherein the data units are IP data packets.

16. A switch as defined in claim 14, wherein the data units are Ethernet frames.

17. A switch as defined in claim 2, wherein said switch includes a plurality of access point routers coupled to respective transport nodes of said switch fabric.

18. A switch as defined in claim 17, wherein each access point router is connected in a data communicative relationship to a different transport node.

19. A switch as defined in claim 18, wherein a transport node forwards a control signal to a respective access point router to regulate a rate of release of data units from said respective access point router toward the transport node.

20. A method for controlling the transport of data units in a switch, said switch comprising:

a plurality of input ports for receiving data units;

a plurality of output ports for releasing data units;

a lossy switch fabric for selectively establishing a plurality of logical pathways between said input ports and said output ports, each logical pathway connecting a certain input port to a certain output port, whereby a data unit received at the certain input port is transported to the certain output port on the logical pathway;

a plurality of transport nodes forming points of transfer of data units to and from said switch fabric, whereby each logical pathway passing through said switch fabric includes at least one transport node of said switch fabric;

said method comprising the steps of:
a) storing in a queue data units flowing through a certain transport node; and
b) controlling a discard of data units at the certain transport node at least in part on a basis of the transport nodes at which the data units have been transferred to said switch fabric.

21. A method as defined in claim 20, wherein said switch is a contained network.

22. A method as defined in claim 21, comprising the step of effecting discard control on data units transferred to said switch fabric at a first transport node independently from the discard control on data units transferred to said switch fabric at a second transport node.

23. A method as defined in claim 22, comprising the step of providing said switch with a discard control mechanism associated with each transport node of said switch.

24. A method as defined in claim 23, wherein each discard control mechanism regulates the discard of data units at a transport node independently from the regulation of data unit discard at a different transport node.

25. A method as defined in claim 22, wherein said discard control mechanism comprises a queue for storage of data units flowing through the transport node associated with the discard control mechanism.

26. A method as defined in claim 25, wherein said discard control mechanism includes a queue for each transport node at which data units are introduced in said switch fabric and reach the transport node that is associated with said discard control mechanism.

27. A method as defined in claim 26, comprising the step of reading a selected field of a frame of a certain data unit to determine the transport node at which the certain data unit has been introduced in said switch fabric, and the step of locating a queue associated with the transport node at which the certain data unit has been introduced in said switch fabric.

28. A method as defined in claim 27, comprising the step of determining a level of fill of the queue associated with the transport node at which the certain data unit has been introduced in said switch fabric.

29. A method as defined in claim 28, comprising the step of discarding the certain data unit when the level of fill of the queue associated with the transport node at which the certain data unit has been introduced in said switch fabric is above a threshold.

30. A method as defined in claim 29, comprising the step of reading priority data in a frame of the certain data unit and the step of utilizing said priority data in determining whether or not to discard the certain data unit when the level of fill of the queue associated with the transport node at which the certain data unit has been introduced in said switch fabric is above the threshold.

31. A method as defined in claim 30, wherein the priority data in the frame of the certain data unit is indicative of at least two priority levels, namely a first level of priority and a second level of priority, the first level of priority being higher than the second level of priority, said method comprising the step of discarding the certain data unit when the priority data is indicative of the second level of priority and the level of fill of the queue associated with the transport node at which the certain data unit has been introduced in said switch fabric is above the threshold.

32. A method as defined in claim 31, comprising the step of releasing of data units from the queues containing data units toward remote transport nodes of said switch fabric.

33. A method as defined in claim 32, wherein the transport nodes of said switch fabric are connected in a store and forward ring architecture.

34. A method as defined in claim 20, wherein the data units are IP data packets.

35. A method as defined in claim 20, wherein the data units are Ethernet frames.

* * * * *

UNITED STATES PATENT AND TRADEMARK OFFICE
CERTIFICATE OF CORRECTION

PATENT NO.    : 6,304,552 B1
DATED         : October 16, 2001
INVENTOR(S)   : Chapman, Alan Stanley John and Kung, Hsiang T.

It is certified that error appears in the above-identified patent and that said Letters Patent is hereby corrected as shown below:

<u>Title page, Item [54] and Column 1, lines 1-3,</u>
Correct the Title to read: -- METHOD AND APPARATUS FOR INPUT BASED CONTROL OF DISCARDS IN A LOSSY PACKET NETWORK --

Signed and Sealed this

Third Day of December, 2002

JAMES E. ROGAN
*Director of the United States Patent and Trademark Office*